United States Patent

[11] 3,596,590

| [72] | Inventor | John Madison Harris<br>P.O. Box 12336, Palm Beach Gardens, Fla. 33403 |
|---|---|---|
| [21] | Appl. No. | 843,496 |
| [22] | Filed | July 22, 1969 |
| [45] | Patented | Aug. 3, 1971 |

[54] COOKING UTENSIL
8 Claims, 2 Drawing Figs.

[52] U.S. Cl.................................................. 99/345, 126/380
[51] Int. Cl...................................................... A47j 37/10
[50] Field of Search........................................... 99/345, 238.4, 355, 356; 107/43, 50; 126/380

[56] References Cited
UNITED STATES PATENTS

| 222,402 | 12/1879 | Hawley | 126/380 X |
| 1,380,656 | 6/1921 | Lauth | 99/345 X |
| 1,409,387 | 3/1922 | Madigan | 126/380 UX |
| 2,132,609 | 10/1938 | Ellinger | 126/380 |
| 2,517,167 | 8/1950 | Bemis | 99/345 X |

Primary Examiner—William I. Price
Assistant Examiner—Arthur O. Henderseon
Attorney—Jack N. McCarthy ABSTRACT: A cover-type cooking utensil wherein food, such as an egg, is cooked on both sides at the same time. The cover-type cooking utensil having a cover with a knob or handle having a reservoir therein for liquid is placed over the food which has previously been placed on a heated surface such as a skillet or grill. Valve means are provided to admit the liquid such as water from said reservoir into the area enclosed by said cover whereby hot vapors such as steam is formed which cooks the side of the food facing the cover at the same time as the food facing the heated surface is cooked.

PATENTED AUG 3 1971 3,596,590
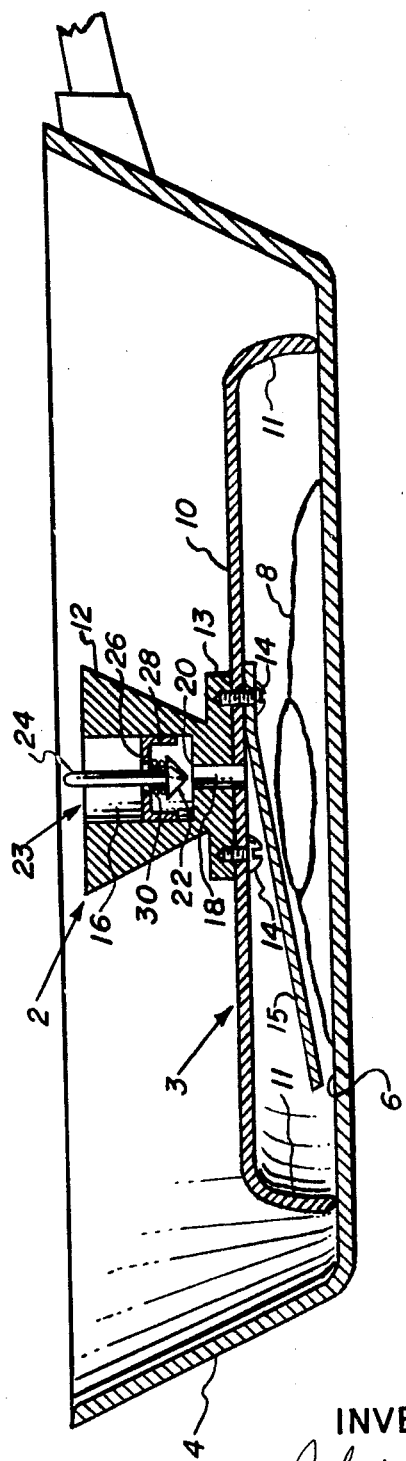
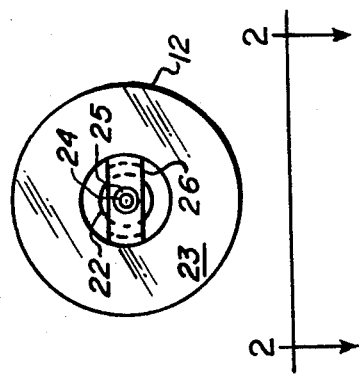
INVENTOR
John Madison Harris

COOKING UTENSIL

BACKGROUND OF THE INVENTION

1. Field of the Invention

This invention relates generally to improvements in cooking utensils, and more particularly, but not by way of limitation, to a utensil for cooking fried foods.

2. Description of the Prior Art

It is well known in the art that some fried foods, and particularly eggs, are difficult to turn for frying on both sides without damaging the structure or appearance of the food. A frying egg is normally turned over by physically lifting the egg from the frying pan or grill and then redepositing the egg in or on the same frying pan or grill on its other side. Only a small percentage of cooks are capable of turning an egg without breaking the yolk of the egg.

Various efforts have been made to construct a cooking utensil wherein eggs can be fried without breaking the yolk of the egg. However, to the best of my knowledge, no practical utensil has been previously provided which permits frying of an egg on both sides without turning the egg. A prior art patent involving turning the egg is U.S. Pat. No. 3,425,340, Cooking Utensil by Joel S. Price.

SUMMARY OF THE INVENTION

This invention involves a cooking utensil for use with a heated surface such as a grill or skillet. The utensil is basically comprised of a lid-type cover with an attached reservoir for containing liquid such as water. A valve is provided therein to permit the flow of said liquid into the area enclosed by said cover.

An object of the invention is to eliminate the turning of fried foods being cooked whereby damage to the appearance or edibility of the food will be eliminated.

Another object of this invention is to provide a cooking utensil whereby eggs may be fried by unskilled cooks without breaking the yolks of said eggs.

A further object of this invention is to provide a cooking utensil which is practical and economically constructed.

An advantage of this invention over the prior art is that the time required to cook a fried egg on both sides is reduced since turnover of the egg is unnecessary.

Other objects and advantages of the invention will be evident from the following detailed description when read in conjunction with the accompanying drawings which illustrate the invention.

BRIEF DESCRIPTION OF THE DRAWING

FIG. 1 is a sectional view of the invention which has been placed in a skillet.

FIG. 2 is a sectional view as taken along lines 2-2 of FIG. 1.

DESCRIPTION OF THE PREFERRED EMBODIMENTS

Referring to the drawings in detail, and particularly to FIGS. 1 and 2, reference character 4 denotes a skillet in which the cooking utensil 3 has been placed. Cooking utensil 3 basically comprises cover 10 having flange 11 extending downwardly from the periphery thereof on one side, and a knob or handle 2 projecting from cover 10 on said other side.

It will be understood that cover 10 and knob 2 may be formed of any desired material, such as sheet metal, aluminum, special glasses or plastics, which will withstand the application of heat when food is being cooked therein. It may also be noted that cover 10 and knob 2 may be formed of substantially one piece of material shaped into the configuration shown in the drawing, but will more normally be two separate items joined by fasteners. Cover 10 may be of any size but for practical purposes its diameter will be of sufficient size to encompass one or two eggs. Reservoir 16 will depend on the size of cover 10 but normally will have a capacity of approximately 1 ounce.

Knob 2, rigidly secured to cover 10 by two screws 14, consists of conically tapered sides 12 tapered downwardly to its substantially circular base 13, a reservoir 16 is an annular recess within said knob or handle 2 and valve means 23 which is positioned within said reservoir 16 by guide means 26. Guide means 26 comprises of flange means 28 which extend downwardly and are secured to walls of said reservoir 16 by an interference fit. Valve means 23 comprises a regular needle valve having a valve seat 20 which seats the conical mating part 22. Cone 22 has permanently connected valve stem 24 which has a diameter smaller than the maximum diameter of said cone 22 and is guided by guide means 26 which is a hole in guide member 26. The diameter of said hole 25 being of sufficient size to permit free vertical movement of valve stem 24 but yet preventing a sloppy fit and permitting cone 22 to act as a limit to the vertical movement. Spring means 30 of sufficient strength to return said valve member 22 from its open position to its mating valve seat 20 but yet not too strong to overcome the friction fit of guide member 26 also retains the valve in a closed position during normal cooking. It will also be observed that if valve members 22 and 24 are made from heavy material the weight of said members 22 and 24 will also reseat valve member 22 to valve seat 20 if normal gravity is present. Valve stem 24 is extended above knob 2 enough to enable a person to open valve means 24 by lifting valve stem 24 with his fingers.

Passage means 18 consists of matching a hole in the bottom of said reservoir 16 which extends through its base 13 to a hole in the center cover 10. The periphery of the top part of passage means 18, which is the hole through base 13, forms valve seat 20.

In use of the cooking utensil 3, let it be assumed that another cooking utensil such as a skillet 4 containing grease or cooking oil is placed over a heat source. The utensil 3 is particularly suited for the frying of eggs, so let it be further assumed that an egg 8 has been placed in skillet 4 and is in the process of being cooked on the side facing heated surface 6. Immediately after egg 8 starts to cook on this one side cooking utensil 3, with reservoir 16 previously filled with water from any water source such as a faucet, is placed over egg 8. Valve 23 is opened to permit water to flow from reservoir 16 through passage 18 onto the heated surface 6. It is to be noted that deflection means 15 attached to the enclosed area of cover 10 can be utilized to prevent water from flowing directly on the egg, however this is not necessary. As the water contacts heated surface 6 steam immediately forms and begins to cook the side of egg 8 facing cover 10. Water droplets causes grease splatter which also aids in frying this side of egg 8. When the usual time has lapsed to cook egg 8 on the side facing surface 6 remove cooking utensil 3. The cook can now easily remove egg 8, which has been cooked on both sides, by use of the usual egg turner or by simply pouring egg 8 from skillet 4.

From the foregoing, it will be apparent that the present invention provides a novel cooking utensil wherein food may be fried on both sides without having to be inverted. The present cooking utensil is particularly suited for frying eggs, whereby any unskilled cook can easily fry an egg on both sides without breaking the yolk. Depending on the size of the heated surface such as a skillet and the diameter of the present utensil, an egg can be fried on a heated surface at the same time the adjacent heated surface is being utilized for cooking other foods. It is also apparent that foreign objects cannot fall or be blown onto the food being cooked under this cooking utensil. It will further be apparent that the present cooking utensil is practical and of economical construction.

Changes may be made in the combination and arrangement of parts or elements as heretofore set forth in the specification and shown in the drawing without departing from the spirit and scope of the invention as defined by the following claims:

I claim:

1. A cooking utensil, comprising:
   a thin cover having flange means extending downwardly from the periphery thereof on one side for engagement with a heated surface, handle means projecting from said cover on said other side, said handle means including an open reservoir in the top thereof, passage means connecting said open reservoir to the one side of said cover within said flange means, manually operable valve means for controlling a flow of liquid from said reservoir through said passage means to the one side of said cover.

2. A combination as set forth in claim 1 wherein said valve means includes means extending out of said reservoir and extending above the handle means for manually moving said valve means.

3. A combination as set forth in claim 2 wherein said manually operable valve means includes a valve stem extending out of said reservoir and a valve cone fixed thereto, said valve stem being guided by guide means fixed relative to said thin cover to axially align said valve cone with said passage means.

4. A combination as set forth in claim 2 wherein deflection means are attached to said cover to direct a flow of liquid from said passage means away from the area directly below said passage means.

5. A combination as set forth in claim 1 wherein a spring means retains the manually operable valve means in a closed position during the cooking process.

6. A combination as set forth in claim 5 wherein said spring is located around said valve stem between the guide means and valve cone.

7. A combination as set forth in claim 1 wherein deflection means is attached to said cover to direct a flow of liquid from said passage means away from the area directly below said passage means.

8. A combination as set forth in claim 1 wherein said open reservoir has a capacity of approximately 1 oz.